US011117271B2

(12) United States Patent
Wagner et al.

(10) Patent No.: US 11,117,271 B2
(45) Date of Patent: *Sep. 14, 2021

(54) SYSTEMS AND METHODS FOR PROVIDING DYNAMIC COMMUNICATIVE LIGHTING IN A ROBOTIC ENVIRONMENT

(71) Applicant: Berkshire Grey, Inc., Bedford, MA (US)

(72) Inventors: Thomas Wagner, Concord, MA (US); Kevin Ahearn, Fort Mill, SC (US); Michael Dawson-Haggerty, Pittsburgh, PA (US); Christopher Geyer, Arlington, MA (US); Thomas Koletschka, Cambridge, MA (US); Kyle Maroney, North Attleboro, MA (US); Matthew T. Mason, Pittsburgh, PA (US); Gene Temple Price, Cambridge, MA (US); Joseph Romano, Arlington, MA (US); Daniel Smith, Canonsburg, PA (US); Siddhartha Srinivasa, Seattle, WA (US); Prasanna Velagapudi, Pittsburgh, PA (US); Thomas Allen, Reading, MA (US)

(73) Assignee: Berkshire Grey, Inc., Bedford, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/826,819

(22) Filed: Mar. 23, 2020

(65) Prior Publication Data
US 2020/0223075 A1 Jul. 16, 2020

Related U.S. Application Data

(63) Continuation of application No. 16/243,753, filed on Jan. 9, 2019, now Pat. No. 10,632,631, which is a
(Continued)

(51) Int. Cl.
B25J 19/06 (2006.01)
B25J 9/16 (2006.01)
G08B 5/36 (2006.01)

(52) U.S. Cl.
CPC .............. B25J 19/06 (2013.01); B25J 9/1676 (2013.01); G08B 5/36 (2013.01); G05B 2219/40196 (2013.01); G05B 2219/40202 (2013.01)

(58) Field of Classification Search
CPC ..... B07C 5/3412; B25J 9/0093; B25J 9/1676; B25J 9/1697; B25J 19/04; B25J 19/06;
(Continued)

(56) References Cited

U.S. PATENT DOCUMENTS 4,412,775 A 11/1983 Molitor et al.
4,557,659 A 12/1985 Scaglia
(Continued)

FOREIGN PATENT DOCUMENTS

CH 701886 A2 3/2011
CN 104870147 A 8/2015
(Continued)

OTHER PUBLICATIONS

First Office Action, and its English translation, issued by the China National Intellectual Property Administration in related Chinese Patent Application No. 201680062748.1 dated Jul. 22, 2020, 20 pages.
(Continued)

Primary Examiner — Stephen R Burgdorf
(74) Attorney, Agent, or Firm — Gesmer Updegrove LLP

(57) ABSTRACT

A robotic system is disclosed that includes an articulated arm with an end effector. The robotic system is for use in a robotic environment requiring interaction with persons in the robotic environment, and includes a plurality of lights
(Continued)

that are illuminated responsive to known near-future movements of the articulated arm to convey the known near-future movements of the articulated arm to the persons in the robot environment.

27 Claims, 4 Drawing Sheets

Related U.S. Application Data continuation of application No. 15/259,961, filed on Sep. 8, 2016, now Pat. No. 10,265,872.

(60) Provisional application No. 62/216,017, filed on Sep. 9, 2015.

(58) Field of Classification Search
CPC .... B65G 1/137; B65G 1/1371; B65G 1/1376; B65G 1/1378; B65G 47/49; G05B 19/409; G05B 19/41895; G05B 2219/40196; G05B 2219/40202; G06Q 10/087; G08B 5/36
USPC .......................................................... 340/679
See application file for complete search history.

(56) References Cited

U.S. PATENT DOCUMENTS

| | | | |
|---|---|---|---|
| 4,704,694 | A | 11/1987 | Czerniejewski |
| 4,846,335 | A | 7/1989 | Hartlepp |
| 4,896,357 | A | 1/1990 | Hatano et al. |
| 5,794,789 | A | 8/1998 | Payson et al. |
| 5,865,487 | A | 2/1999 | Gore et al. |
| 5,881,890 | A * | 3/1999 | Wiley ................. B07C 7/04 209/703 |
| 6,079,570 | A | 6/2000 | Oppliger et al. |
| 6,865,487 | B2 | 3/2005 | Charron |
| 7,313,464 | B1 | 12/2007 | Perreault et al. |
| 7,474,939 | B2 | 1/2009 | Oda et al. |
| 7,516,848 | B1 | 4/2009 | Shakes et al. |
| 7,677,622 | B2 | 3/2010 | Dunkmann et al. |
| 7,861,844 | B2 | 1/2011 | Hayduchok et al. |
| 8,718,814 | B1 | 5/2014 | Clark et al. |
| 8,874,270 | B2 | 10/2014 | Ando |
| 8,952,284 | B1 | 2/2015 | Wong et al. |
| 9,061,868 | B1 | 6/2015 | Paulsen et al. |
| 9,120,622 | B1 | 9/2015 | Elazary et al. |
| 9,227,323 | B1 | 1/2016 | Konolige et al. |
| 9,259,844 | B2 | 2/2016 | Xu et al. |
| 9,492,923 | B2 | 11/2016 | Wellman et al. |
| 9,604,363 | B2 | 3/2017 | Ban |
| 2001/0045755 | A1 | 11/2001 | Schick et al. |
| 2001/0056316 | A1 | 12/2001 | Johnson et al. |
| 2003/0135300 | A1 | 7/2003 | Lewis |
| 2006/0177295 | A1 | 8/2006 | Frueh et al. |
| 2006/0242785 | A1 | 11/2006 | Cawley et al. |
| 2007/0005179 | A1 | 1/2007 | Mccrackin et al. |
| 2008/0179224 | A1 | 7/2008 | Van Bossuyt |
| 2008/0181485 | A1 | 7/2008 | Beis et al. |
| 2009/0019818 | A1 | 1/2009 | Gilmore et al. |
| 2010/0125361 | A1 | 5/2010 | Mougin et al. |
| 2010/0180711 | A1 | 7/2010 | Kilibarda et al. |
| 2010/0234857 | A1 | 9/2010 | Itkowitz et al. |
| 2011/0144798 | A1 | 6/2011 | Freudelsperger |
| 2011/0176148 | A1 | 7/2011 | Briggs et al. |
| 2011/0184555 | A1 | 7/2011 | Kosuge et al. |
| 2011/0320036 | A1 | 12/2011 | Freudelsperger |
| 2012/0215346 | A1 | 8/2012 | Gingher et al. |
| 2013/0232918 | A1 | 9/2013 | Lomerson, Jr. |
| 2013/0245824 | A1 | 9/2013 | Barajas et al. |
| 2013/0343640 | A1 | 12/2013 | Buehler et al. |
| 2014/0005831 | A1 | 1/2014 | Naderer et al. |
| 2014/0067121 | A1 | 3/2014 | Brooks et al. |
| 2014/0067127 | A1 | 3/2014 | Gotou |
| 2014/0195979 | A1 | 7/2014 | Branton et al. |
| 2014/0291112 | A1 | 10/2014 | Lyon et al. |
| 2014/0305847 | A1 | 10/2014 | Kudrus |
| 2015/0057793 | A1 | 2/2015 | Kawano |
| 2015/0073589 | A1 | 3/2015 | Khodl et al. |
| 2015/0081090 | A1 | 3/2015 | Dong |
| 2015/0217937 | A1 | 8/2015 | Marquez |
| 2015/0224650 | A1 | 8/2015 | Xu et al. |
| 2015/0369618 | A1 | 12/2015 | Barnard et al. |
| 2015/0375401 | A1 | 12/2015 | Dunkmann et al. |
| 2016/0027093 | A1 | 1/2016 | Crebier |
| 2016/0136816 | A1 | 5/2016 | Pistorino |
| 2016/0199884 | A1 | 7/2016 | Lykkegaard et al. |
| 2016/0243704 | A1 | 8/2016 | Vakanski et al. |
| 2016/0244262 | A1 | 8/2016 | O'Brien et al. |
| 2017/0043953 | A1 | 2/2017 | Battles et al. |
| 2017/0050315 | A1 | 2/2017 | Henry et al. |
| 2017/0066597 | A1 | 3/2017 | Hiroi |
| 2017/0080566 | A1 | 3/2017 | Stubbs et al. |
| 2017/0106532 | A1 | 4/2017 | Wellman et al. |

FOREIGN PATENT DOCUMENTS

| | | |
|---|---|---|
| DE | 102007038834 A1 | 2/2009 |
| EP | 0613841 A1 | 9/1994 |
| EP | 1256421 A1 | 1/2008 |
| EP | 1995192 A2 | 11/2008 |
| EP | 2960024 A2 | 12/2015 |
| EP | 3006379 A2 | 4/2016 |
| WO | 2010034044 A2 | 4/2010 |
| WO | 2010099873 A1 | 9/2010 |
| WO | 2014111483 A1 | 7/2014 |
| WO | 2015162390 A1 | 10/2015 |

OTHER PUBLICATIONS

Office Action, and its English translation, issued by the China National Intellectual Property Administration in related Chinese Patent Application No. 201680062748.1 dated Feb. 20, 2021, 18 pages.

International Preliminary Report on Patentability issued by the International Bureau of WIPO dated Mar. 13, 2018 in related International Application No. PCT/US2016/050786, 7 pages.

Examiner's Report issued by the Canadian Intellectual Property Office dated May 16, 2019 in related Canadian Patent Application No. 2,998,403, 3 pages.

International Search Report and Written Opinion issued by the International Searching Authority dated Nov. 24, 2016 for International Application No. PCT/US2016/050786, 9 pages.

Communication pursuant to Rules 161(1) and 162 EPC issued by the European Patent Office dated Apr. 17, 2018 in related European Patent Application No. 16767467.0, 3 pages.

Non-Final Office Action issued by the U.S. Patent and Trademark Office dated Jul. 10, 2017 in related U.S. Appl. No. 15/259,961, 31 pages.

Final Office Action issued by the U.S. Patent and Trademark Office dated Feb. 13, 2018 in related U.S. Appl. No. 15/259,961, 33 pages.

Liu et al., "Hand Arm Coordination for a Tomato Harvesting Robot Based on Commercial Manipulator," Proc. of the IEEE, Int'l Conf. on Robotics and Biometrics, Dec. 2013, pp. 2715-2720.

Vitton et al., "A Flexible Robotic Gripper for Automation of Assembly Tasks," Proc. of the ASME—Dynamic Systems & Control Div., 2003, vol. 2, 7 pages.

Herbert et al., "A Robotic Gripper System for Limp Material Manipulation: Hardware and Sofware Development and Integration," Proc. of the 1997 IEEE, Int'l Conf. on Robotics and Automation, Apr. 1997, pp. 15-21.

Cipolla et al., "Visually Guided Grasping in Unstructured Environments," J. of Robotics and Autonomous Sys., pp. 1-20.

Klingbeil et al., "Grasping with Application to an Autonomous Checkout Robot," Proc. of IEEE, Int'l Conf. on Robotics and Automation, Jun. 2011, 9 pages.

Non-Final Office Action issued by the U.S. Patent and Trademark Office dated Dec. 20, 2019 in related U.S. Appl. No. 16/243,753, 35 pages.

(56) References Cited

OTHER PUBLICATIONS

Non-Final Office Action issued by the U.S. Patent and Trademark Office dated Aug. 21, 2018 in related U.S. Appl. No. 15/259,961, 31 pages.
Notice on the Third Office Action and the Third Office Action, along with its English translation, issued by the China National Intellectual Property Administration in related Chinese Patent Application No. 201680062748.1 dated Jun. 30, 2021, 23 pages.

* cited by examiner

SYSTEMS AND METHODS FOR PROVIDING DYNAMIC COMMUNICATIVE LIGHTING IN A ROBOTIC ENVIRONMENT

PRIORITY

The present application is a continuation of U.S. patent application Ser. No. 16/243,753, filed Jan. 9, 2019, which is a continuation of U.S. patent application Ser. No. 15/259,961, filed Sep. 8, 2016, now U.S. Pat. No. 10,265,872, issued Apr. 23, 2019, which claims priority to U.S. Provisional Patent Application Ser. No. 62/216,017 filed Sep. 9, 2015, the entire disclosures of which are hereby incorporated by reference in their entireties.

BACKGROUND

The invention generally relates to robotic systems, and relates in particular, to robotic systems that are used in an environment involving human activity.

Certain robotic systems are intended to be used in environments that also include people. In warehouse sortation environments for example, human workers are responsible for taking objects and placing them onto shelves in correct locations. A common paradigm is to use workcells with put-to-light systems to facilitate this process by indicating via lights the desired target location. These systems typically employ either monochromatic lights or have a display showing the number of items that the worker should place on the shelf. By using these lights as visual cues, valuable time is shaved off of the sortation task. Additionally, workers may have issues sorting particular unexpected, damaged, non-bar-coded or otherwise problematic unsortable items. When workers come across objects such as these, they may raise a small flag or activatable light to indicate to a manager or foreman that they had issues processing an item. This allows them to continue sorting without leaving their work area.

Current solutions such as put-to-light however, do not translate well for use in automated systems. Using lighting to demonstrate to a robot where to place an object may in fact, be fundamentally worse than sending it placement locations directly from a Warehouse Management System or other database. As such, automated systems do not typically use lighting in determining object placement. Further, human workers who work in sortation facilities may have preconceived expectations of the role lighting plays in sortation. There remains a need therefore, for a robotic system that is able to better, quickly and efficiently communicate with human workers in the robotic environment, information that may help to keep each human worker safe from injury.

SUMMARY

In accordance with an embodiment, the invention provides a robotic system including an articulated arm with an end effector. The robotic system is for use in a robotic environment requiring interaction with persons in the robotic environment, and the robotic system includes a plurality of lights that are illuminated responsive to known near-future movements of the articulated arm to convey the known near-future movements of the articulated arm to the persons in the robot environment.

In accordance with another embodiment, the invention provides a robotic system including an articulated arm with an end effector. The robotic system is for use in an environment requiring interaction with persons in the robotic system and includes a plurality of sortation locations and a plurality of lights that are each associated with a sortation location. The system provides that one or more of the plurality of lights is engageable to be illuminated to indicate that the system plans to move the end effector toward a sortation location that is associated with the one or more of the plurality of lights.

In accordance with a further embodiment, the invention provides a method of providing communication lighting in a robotic environment requiring interaction with persons in the robotic environment. The method includes the steps of providing in the robotic environment, a robotic system having an end effector, and providing illumination indicative of a planned direction of movement of the end effector of the robotic system in the robotic environment.

BRIEF DESCRIPTION OF THE DRAWINGS

The following description may be further understood with reference to the accompanying drawings in which.

The drawings are shown for illustrative purposes only.

DETAILED DESCRIPTION

In accordance with an embodiment the invention provides lighting system for use in robotic sortation environment, as well as the use of such a system for conveying system state. In certain embodiments, an array of RGB LEDs is placed on shelves, and an array of RGB LEDs is mounted on an end effector or manipulator. In further embodiments, the invention provides a method of conveying robot state using these systems as well as a light pole.

The invention therefore provides systems and methods for conveying state and near-future information via LED arrays during robotic sortation. In certain embodiments, the invention provides systems and methods for facilitating communication with human workers.

In accordance with various embodiments, the invention provides a robotic system that includes an array of RGB LEDs mounted above or below shelves, and provides in an example, information regarding where the automated system will place future objects, the location of previously placed objects, and general system state. An array of RGB LEDs may be mounted on a manipulator or end effector. The invention also provides for the use of the system in conveying information about the process of picking objects, the qualities of picked objects, the qualities of grasps on objects, and general system state, as well as the use of light poles in conveying automated system state for sortation.

Figure 1:
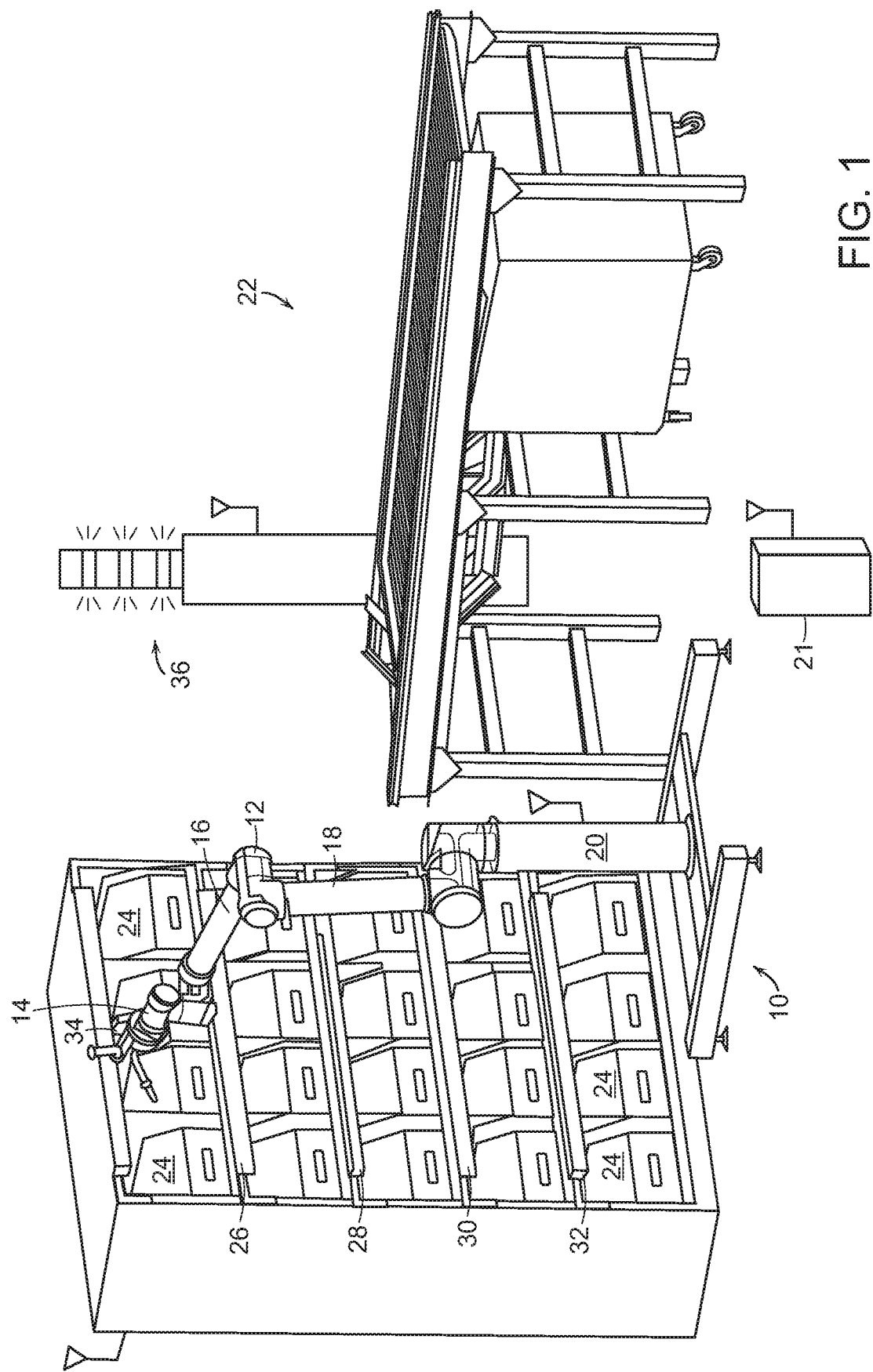
FIG. 1 shows an illustrative diagrammatic view of a robotic system in accordance with an embodiment of the present invention.

FIG. 1, for example, shows a system in accordance with an embodiment of the present invention that includes a robotic system 10 including an articulated arm 12. The articulated arm 12 includes an end effector 14 as well as articulated segments 16, 18 and 20 and is, for example, programmed for picking items from a conveyor 22 and for placing the items in one of several correct bins or sortation locations 24. The robotic system is designed to be employed in an environment that includes human workers that may provide items to the conveyor, remove full bins, provide maintenance of the articulated arms or otherwise perform services that require that they be present in and move around in the robotic environment.

As also shown in FIG. 1, the robotic system may include lighting systems 26, 28, 30 and 32 on shelves that support the bins 24, as well as a lighting system 34 that is located on the end effector 14 for conveying information regarding a state of the end effector, and a lighting system 36 that is indicative of the state of the robot. The robotic system may include a controller in a base of the articulated arm, or may include a remote controller 21 that communicates either wirelessly or by directly wiring to the articulated arm and the robotic environment.

Figure 2:
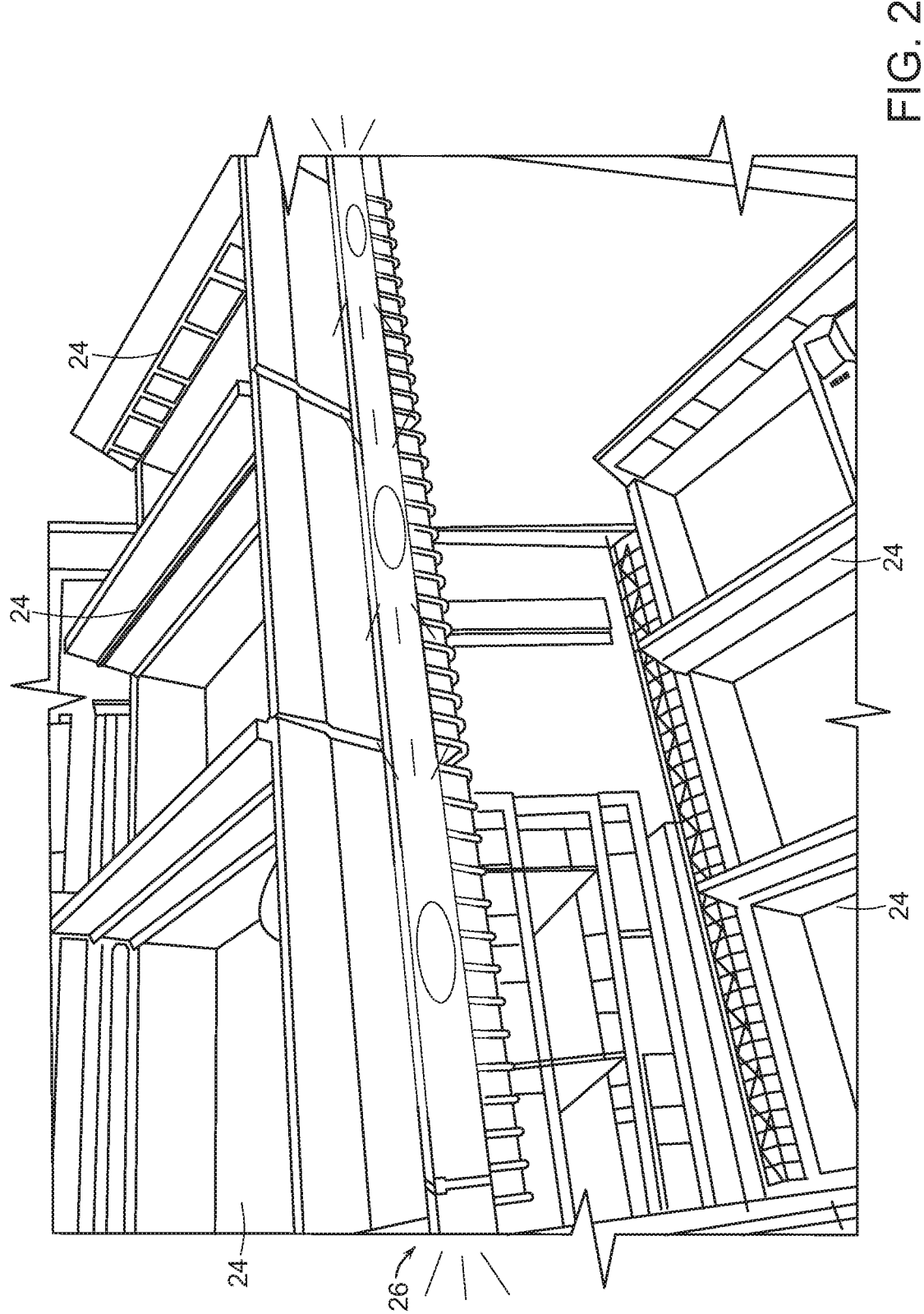
FIG. 2 shows an illustrative diagrammatic view of a destination location portion of the robotic system as shown in FIG. 1.

FIG. 2, for example, shows a lighting system such as any of systems 22, 24, 26 and 28 of FIG. 1 wherein each includes a lighting strip 26 positioned above or below a shelf of bins 24. Each strip of RGB LEDs 26 is mounted on individual shelves and covered with translucent plastic. Controllers are mounted on the side of shelving units. LEDs may be individually controlled through software over a local WiFi network in order to show system state. The lighting strips 26 may be illuminated, for example, in a first color or a first mode (e.g., a first flashing mode) to convey that the system is planning to move the end effector to the associate bin or destination location. Further, the lighting strip may be illuminated in a second color or a second mode (e.g., second flashing mode) to indicate that the associated destination location or bin is full and needs to be removed by a human worker.

In accordance with certain embodiments of the invention therefore, the lighting system may convey the state of the robotic sortation task, as well as the state of the robot. For example, in an embodiment, after the system has selected a place location, a subset of the RGB LEDs 26 adjacent to the place location are illuminated in a pulsing color in order to demonstrate where the robot will place its next object. Once objects are placed, the same LEDs are illuminated in a different color in order to indicate a successful place. Similarly, when performing tasks requiring caution or when an error has occurred, all lights can be placed into a pulsing orange or red color, respectively. Conveying system state in this manner provides human workers with easily accessible and digestible information about the task at hand and allows for advanced collaborative interaction with automated systems.

Figure 3:
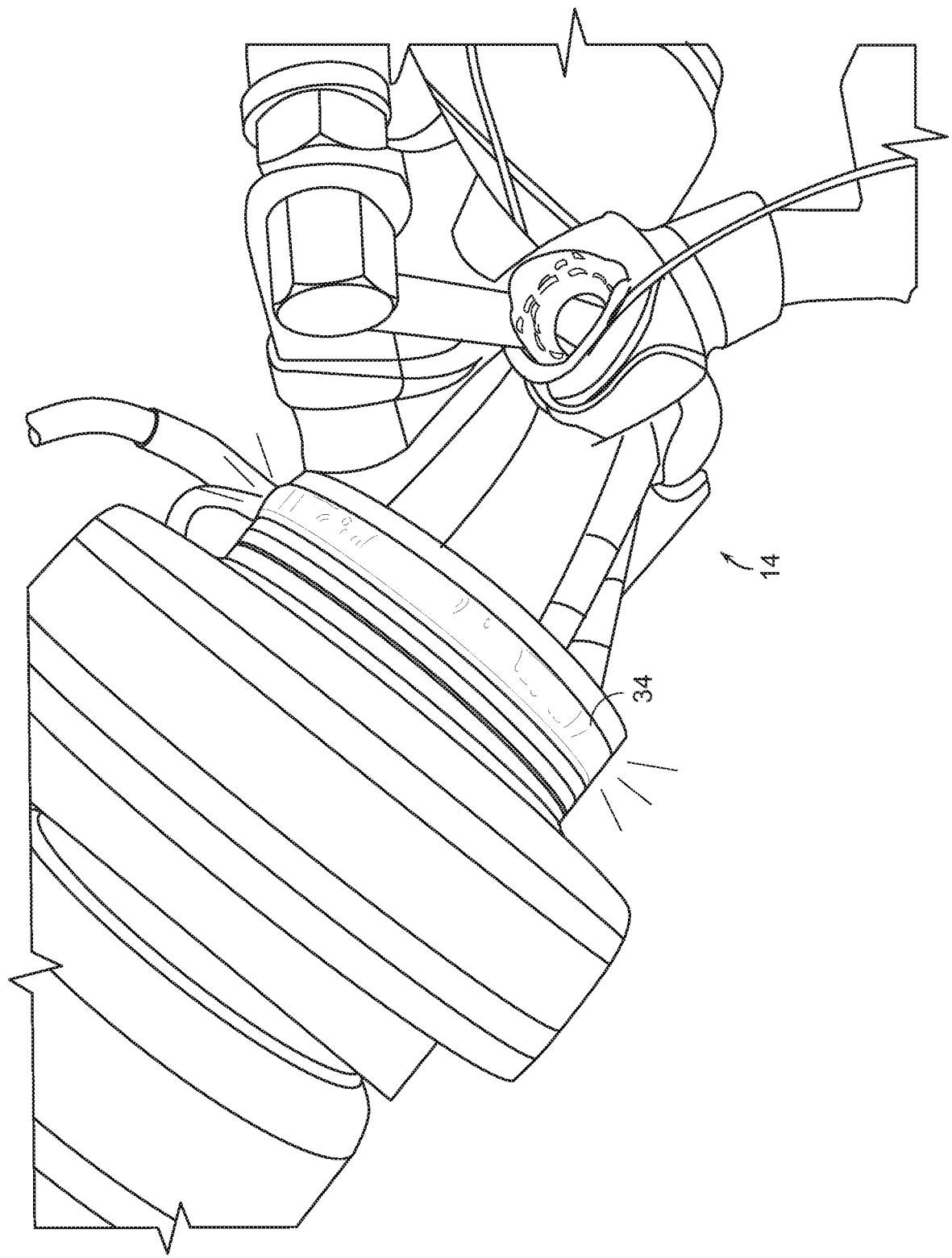
FIG. 3 shows an illustrative diagrammatic view of an end effector portion of the robotic system as shown in FIG. 1.

FIG. 3 shows a lighting system in accordance with an embodiment that includes LEDs 34 that are mounted in a ring on the end effector 14, and are visible through a translucent circular plastic cover. The lights 34 on the end effector 14 are used to convey information about objects about the state of the robot, as well as the state of the system. When objects are picked up, the LEDs 34 are briefly illuminated to indicate a successful grasp, or may show a different color if the item is to be returned to the conveyor 22 due to a compromised grasp, the lights 34 may show a different color and/or flashing illumination. When the robot has entered a different mode, such as movement to a sortation bin, the LEDs 34 are illuminated with different colors. The lights 34 may also be used to show an anticipated direction of movement of the end effector, for example, by having the lights flash green on a side in the direction of which the end effector is about to be moved. Again, the lights 34 may be illuminated with different colors or modes of flashing to communicate robotic state, end effector state, and end effector direction of planned movement.

Figure 4:
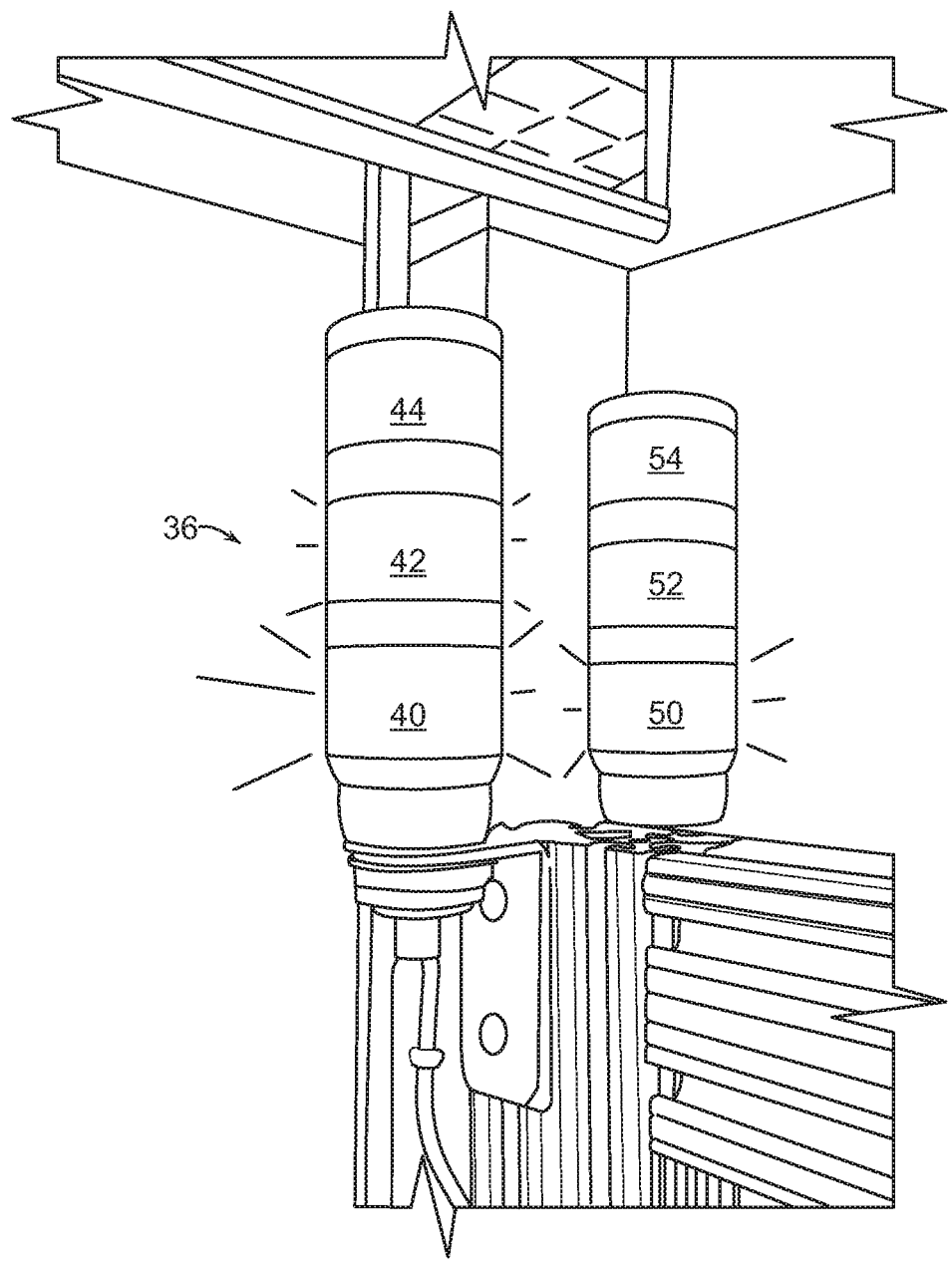
FIG. 4 shows an illustrative diagrammatic view of a plurality of station identification locations of the robotic system of FIG. 1.

FIG. 4 shows an lighting system in accordance with a further embodiment of the invention that includes a lighting system 36, which includes a light pole having individual lights 40, 42 and 44, which are used to indicate system state to human workers who may not be in an immediate area. Typically, this involves illuminating a green light when the system is running and a red light when the system has entered an error state. More complicated states, such as when the system is waiting for additional items to sort, may also be provided. Additional robotic adjacent systems may include other lighting systems including lights 50, 52 and 54. As noted above, the lights 34 may be illuminated with different colors or modes of flashing to communicate robotic state, end effector state, or end effector direction of planned movement.

In accordance with various embodiments, therefore, the plurality of lights may be multi-colored lights proximate to an end effector of the articulated arm. In further embodiments, the plurality of multi-colored lights may be indicative of an intended direction of movement of the end effector, or may be indicative of the end effector grasp quality on an object. In further embodiments, the plurality of multi-colored lights may be provided on a wrist of the end effector, and may be indicative of the robotic system not having proper information regarding a required task for an object, or indicative of the robotic system not recognizing the object. In further embodiments, the plurality of multi-colored lights may be indicative of the robotic system not knowing where to put an object, or may be indicative of where an end effector is being directed. In certain embodiments, the plurality of multi-colored lights include lights at potential target locations that are indicative of when a target location bin is full or otherwise completed.

Those skilled in the art will appreciate that numerous modifications and variations may be made to the above disclosed embodiments without departing from the spirit and scope of the present invention.

What is claimed is:

1. A robotic system including an articulated arm with an end effector, said robotic system comprising a first plurality of lights provided in a ring proximate the end effector, and a second plurality of lights provided proximate a plurality of destination bins, each of the second plurality of lights being associated with one of the plurality of destination bins, said first plurality of lights being engageable in a movement mode to indicate a planned direction of movement of the end effector by illuminating one or more of the first plurality of lights that are on a side of the ring that is associated with the planned direction of movement of the end effector, the first plurality of lights being engageable in a grasp quality mode to indicate a grasp quality of the end effector's grasp on an object, and the first plurality of lights being further engageable in an unknown object mode to indicate that the robotic system does not recognize the object;

said second plurality of lights being engageable in a destination bin mode to indicate a destination bin to which the end effector plans to move the object, and the second plurality of lights being engageable in a bin complete mode to indicate that a particular destination bin is ready for removal.

2. The robotic system as claimed in claim 1, wherein the first plurality of lights is further engageable in an unknown object mode to indicate that the robotic system does not have sufficient information regarding to where the object is to be moved.

3. The robotic system as claimed in claim 1, wherein the first plurality of lights include multi-colored lights.

4. The robotic system as claimed in claim 1, wherein the first plurality of lights include flashing lights.

5. The robotic system as claimed in claim 1, wherein the second plurality of lights include multi-colored lights.

6. The robotic system as claimed in claim 1, wherein the second plurality of lights include flashing lights.

7. The robotic system as claimed in claim 1, wherein the system further includes a third plurality of lights that are engageable in a processing mode to indicate that a processing station that includes the articulated arm is engaged in processing a plurality of objects, and the third plurality of lights is further engageable in an alert mode to indicate that an error has occurred at the processing station.

8. The robotic system as claimed in claim 7, wherein the third plurality of lights include multi-colored lights.

9. The robotic system as claimed in claim 7, wherein the third plurality of lights include flashing lights.

10. A robotic system including an articulated arm with an end effector, said robotic system comprising a first plurality of lights provided in a ring proximate the end effector, and a second plurality of lights provided proximate a plurality of destination bins, each of the second plurality of lights being associated with one of the plurality of destination bins, said first plurality of lights being engageable in a movement mode to indicate a planned direction of movement of the end effector by illuminating one or more of the first plurality of lights that are on a side of the ring that is associated with the planned direction of movement of the end effector, the first plurality of lights being engageable in a grasp quality mode to indicate a grasp quality of the end effector's grasp on an object, and the first plurality of lights being further engageable in an unknown object mode to indicate that the robotic system does not have sufficient information regarding to where the object is to be moved;

said second plurality of lights being engageable in destination bin mode to indicate a destination bin to which the end effector plans to move the object, and the second plurality of lights being engageable in a bin complete mode to indicate that a particular destination bin is ready for removal.

11. The robotic system as claimed in claim 10, wherein the first plurality of lights are further engageable in an unknown object mode to indicate that the robotic system does not recognize the object.

12. The robotic system as claimed in claim 10, wherein the first plurality of lights include multi-colored lights.

13. The robotic system as claimed in claim 10, wherein the first plurality of lights include flashing lights.

14. The robotic system as claimed in claim 10, wherein the second plurality of lights include multi-colored lights.

15. The robotic system as claimed in claim 10, wherein the second plurality of lights include flashing lights.

16. The robotic system as claimed in claim 10, wherein the system further includes a third plurality of lights that are engageable in a processing mode to indicate that a processing station that includes the articulated arm is engaged in processing a plurality of objects, and the third plurality of lights is further engageable in an alert mode to indicate that an error has occurred at the processing station.

17. The robotic system as claimed in claim 16, wherein the third plurality of lights include multi-colored lights.

18. The robotic system as claimed in claim 16, wherein the third plurality of lights include flashing lights.

19. A robotic system including a plurality of processing stations, each processing station including an articulated arm with an end effector, said robotic system comprising a first plurality of lights provided in a ring proximate the end effector, a second plurality of lights provided proximate a plurality of destination bins, each of the second plurality of lights being associated with one of the plurality of destination bins, and a third plurality of lights at least one of which is associated with a respective processing station, said first plurality of lights being engageable in a movement mode to indicate a planned direction of movement of the end effector at the respective processing station by illuminating one or more of the first plurality of lights that are on a side of the ring that is associated with the planned direction of movement of the end effector, the first plurality of lights being engageable in a grasp quality mode to indicate a grasp quality of the end effector's grasp on an object;

said second plurality of lights being engageable in destination bin mode to indicate a destination bin of the plurality of destination bins at the respective processing station to which the end effector plans to move the object, and the second plurality of lights being engageable in a bin complete mode to indicate that a particular destination bin is ready for removal; and said third plurality of lights being engageable in a processing mode to indicate that the respective processing station is engaged in processing a plurality of objects, and the third plurality of lights being engageable in an alert mode to indicate that an error has occurred at the respective processing station.

20. The robotic system as claimed in claim 19, wherein the first plurality of lights is further engageable in an unknown object mode to indicate that the robotic system does not have sufficient information regarding to where the object is to be moved.

21. The robotic system as claimed in claim 19, wherein the first plurality of lights are further engageable in an unknown object mode to indicate that the robotic system does not recognize the object.

22. The robotic system as claimed in claim 19, wherein the first plurality of lights include multi-colored lights.

23. The robotic system as claimed in claim 19, wherein the first plurality of lights include flashing lights.

24. The robotic system as claimed in claim 19, wherein the second plurality of lights include multi-colored lights.

25. The robotic system as claimed in claim 19, wherein the second plurality of lights include flashing lights.

26. The robotic system as claimed in claim 19, wherein the third plurality of lights include multi-colored lights.

27. The robotic system as claimed in claim 19, wherein the third plurality of lights include flashing lights.

* * * * *